(12) United States Patent
Kreuchauf et al.

(10) Patent No.: US 8,543,872 B2
(45) Date of Patent: Sep. 24, 2013

(54) DETECTING AND ELIMINATING POTENTIAL PERFORMANCE DEGRADATION CAUSED BY NEIGHBORING IDENTICAL SCRAMBLING CODES

(75) Inventors: Juergen Kreuchauf, San Francisco, CA (US); Thorsten Clevorn, Duesseldorf (DE)

(73) Assignee: Infineon Technologies AG, Neubiberg (DE)

( * ) Notice: Subject to any disclaimer, the term of this patent is extended or adjusted under 35 U.S.C. 154(b) by 271 days.

(21) Appl. No.: 13/012,257

(22) Filed: Jan. 24, 2011

(65) Prior Publication Data

US 2012/0192020 A1   Jul. 26, 2012

(51) Int. Cl.
*G01R 31/28* (2006.01)
(52) U.S. Cl.
USPC ............................ 714/704; 714/786; 714/796
(58) Field of Classification Search
USPC ................. 714/704, 786, 774, 779, 800, 776, 714/795, 796; 370/335, 342, 509
See application file for complete search history.

(56) References Cited

U.S. PATENT DOCUMENTS

| | | | |
|---|---|---|---|
| 6,904,106 B2* | 6/2005 | Papasakellariou et al. | 375/341 |
| 6,917,629 B1* | 7/2005 | Ramesh et al. | 370/509 |
| 6,934,318 B2* | 8/2005 | Sarkar | 375/141 |
| 8,311,492 B2* | 11/2012 | Kim et al. | 455/101 |
| 2002/0131390 A1* | 9/2002 | Kuo et al. | 370/342 |
| 2007/0041348 A1* | 2/2007 | Kwun et al. | 370/335 |

* cited by examiner

*Primary Examiner* — Fritz Alphonse
(74) *Attorney, Agent, or Firm* — Eschweiler & Associates, LLC

(57) ABSTRACT

One embodiment of the present invention relates to a method of detecting potential performance degradation caused by neighboring identical scrambling codes. The method includes detecting an existence of identical scrambling codes in received signals from different cell at the user equipment, and selectively eliminating one or more signals from consideration in processing of received signals based upon the detection. The invention also includes a receiver configured to detect potential performance degradation caused by neighboring identical scrambling codes. The receiver includes a detection component configured to detect an existence of identical scrambling codes in received signals from different base stations at the user equipment, and an elimination component configured to selectively eliminate one or more signals from consideration in processing of received signals based upon the detection by the detection component.

20 Claims, 3 Drawing Sheets

US 8,543,872 B2

DETECTING AND ELIMINATING POTENTIAL PERFORMANCE DEGRADATION CAUSED BY NEIGHBORING IDENTICAL SCRAMBLING CODES

FIELD

The present invention relates generally to communication systems, and more particularly for a system and method of addressing issues caused by neighboring identical scrambling codes at a user equipment location.

BACKGROUND

During a cell search, the user equipment (UE) (e.g., a mobile communication handset) searches for a cell and determines the downlink scrambling code and frame synchronization of that cell. The cell search is typically carried out in three steps: (1) slot synchronization, (2) frame synchronization and code-group identification, and (3) scrambling code identification.

In the slot synchronization phase, the UE uses the SCH's primary synchronization code to acquire slot synchronization to a cell. This is typically done with a single matched filter (or any similar device) matched to the primary synchronization code which is common to all cells. The slot timing of the cell can be obtained by detecting peaks in the matched filter output. In the second step of the cell search procedure, the UE uses the SCH's secondary synchronization code to find frame synchronization and identify the code group of the cell found in the first step. This is done by correlating the received signal with all possible secondary synchronization code sequences, and identifying the maximum correlation value. Since the cyclic shifts of the sequences are unique, the code group as well as the frame synchronization is determined. Lastly, in the final step of the cell search procedure, the UE determines the exact primary scrambling code (PSC) used by the found cell. The primary scrambling code (PSC) is typically identified through symbol-by-symbol correlation over the CPICH with all codes within the code group identified in the second step. After the primary scrambling code (PSC) has been identified, the primary CCPCH can be detected and the system- and cell-specific BCH information can be read.

Once the primary scrambling code (PSC) is identified, subsequent signals received at the UE are identified as coming from the cell via the primary scrambling code (PSC). Consequently, in order for the UE to distinguish between different cells, each cell (BTS) requires a unique primary scrambling code (PSC) out of the 512 codes that are available.

DETAILED DESCRIPTION

Figure 1:
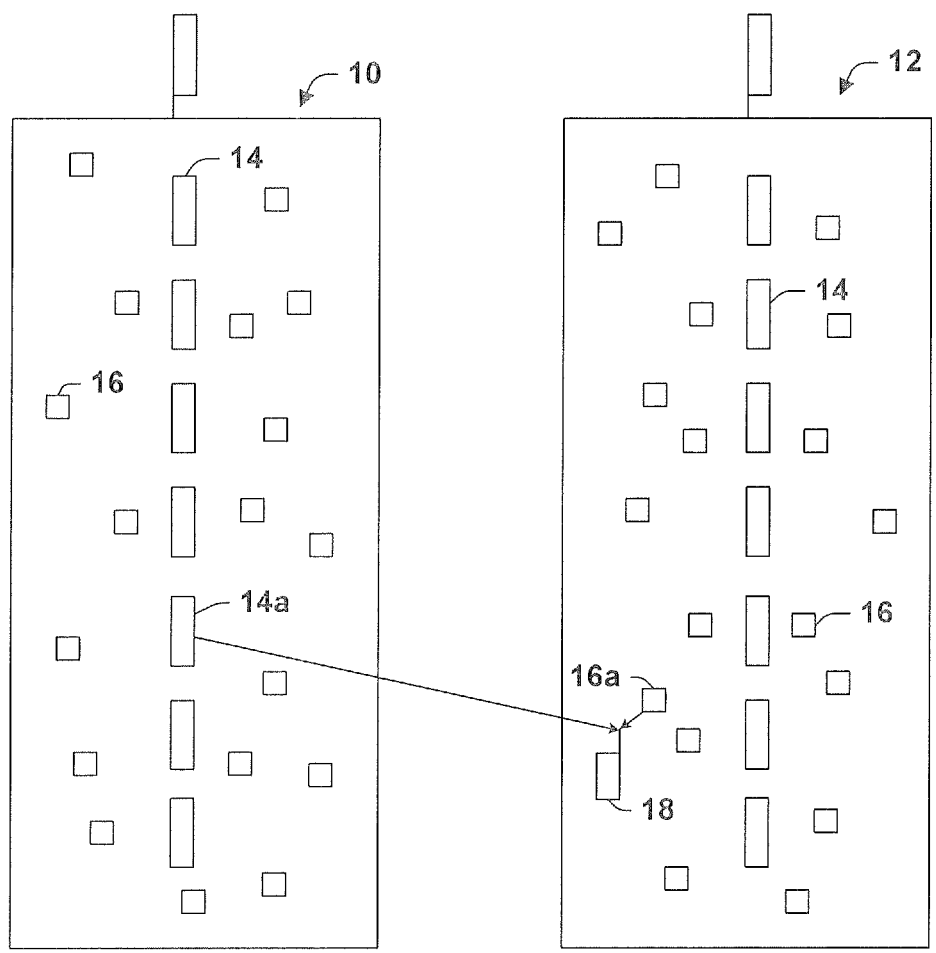
FIG. 1 is a block diagram illustrating two buildings in a dense user area having multiple base stations and femto cells, wherein a base station and a femto cell employ an identical primary scrambling code (PSC) in an overlapping area.

The present invention will now be described with reference to the attached drawing figures, wherein like reference numerals are used to refer to like elements throughout, and wherein the illustrated structures and devices are not necessarily drawn to scale.

Unlike previous frequency division multiple access (FDMA) mobile networks, wideband code division multiple access (WCDMA) networks do not require frequency planning, since a common carrier can be used across all cells. Instead, WCDMA relies on a concept of scrambling codes to differentiate among cells. Code planning within a WCDMA network is sometimes performed by a radio network planning team, however, there is a need for improvement to address instances when cellular networks (NW) run into resource limitations by exhausting their fixed number of available primary scrambling codes (PSCs).

It has been ascertained by the inventors of the present invention that cellular networks (NW) run into resource limitations by exhausting their fixed number (512) of available primary scrambling codes (PSC). Such limitations are caused by the network operator's lack of network planning in some limited instances, or by the distribution of PSCs that is not under the control of the cellular network, or by a combination of both.

In order for user equipment (UE) such as a handheld communication device to distinguish between different cells in a cellular network, each cell or base station (BTS) requires a unique PSC out of the 512 PSCs available. This requirement may result in difficulties in situations where a lack of network planning, or in locations having extremely high density, coverage scenarios occur in which cells having an identical PSC overlap each other. For example, in locations where several large office buildings reside within a critical area, it is possible that a UE may see different cells having an identical PSC. Such a scenario is illustrated in FIG. 1, for example. In FIG. 1, two large buildings 10, 12 within the same area or node are illustrated. Within each building 10, 12 that is within the node, a large number of based stations 14 exist, wherein each base station 14 is configured to employ its own unique PSC out of the 512 PSCs available within a given cell node. While proper cellular network planning should prevent multiple base stations within a single node of having an identical PSC, it is possible that a mistake in planning may result in more than one base station employing the same PSC. A more probable scenario exists with a distribution of PSCs outside of the control of the NW itself. For example, privately set up femto cells 16 are often constructed within large office buildings to increase capacity. Such femto cells are set up without the permission or knowledge of the NW provider, and thus the chance of a base station and a femto cell employing an identical PSC increases substantially.

In the case where multiple base stations employ the same PSC in an overlapping area, the demodulation performance of the UE is severely degraded due to interference by despreading/descrambling of the same PSC that is wrongly/inadvertently used and added to the demodulation data coming from the correct cell. That is, while for a different PSC (the typical case) the signal interference is reduced (i.e., whitened) by the descrambling, the signal within the node with erroneously the same PSC is coherently amplified by the descrambling, thus creating a large amount of interference. Such interference can result in significant degradation of UE performance, for example, resulting in call drops of ongoing voice calls which is one of the most important quality criteria for UE and NW performance.

Thus the inventors of the present invention have appreciated that while the above problem can typically be avoided by network planning, network operators do not have control over third parties who choose to set up their own cells (e.g., femto cells). Since use of such femto cells is becoming more popular because it is a relatively easy, cost-effective way to bridge coverage and address the lack of bandwidth, the possibility of a UE seeing base stations having the same PSC is increasing, thereby resulting in decreased performance.

Turning now to FIG. 1, two buildings 10, 12 are illustrated in close physical proximity to one another, such that both buildings reside within an overlapping cell area. Each building 10, 12 has a plurality of in-house nodes or base stations (BTS) 14 therein, which are located therein by the network operator (NW) according to a network planning regime. Consequently, each of the base stations 14 operate with a unique scrambling code (PSC). In addition to the base stations 14, however, each building 10, 12 likely has a significant number of femto cells 16 therein, placed there by third parties that are not under the control of the network operators. As illustrated in FIG. 1, a user equipment (UE) 18 within the building 12 may receive signals from two sources (14a and 16a) that have an identical primary scrambling code (PSC). The present invention is directed to a method and apparatus for detecting this potential condition, and taking corrective action to prevent the degradation of performance that would otherwise occur.

Figure 2:
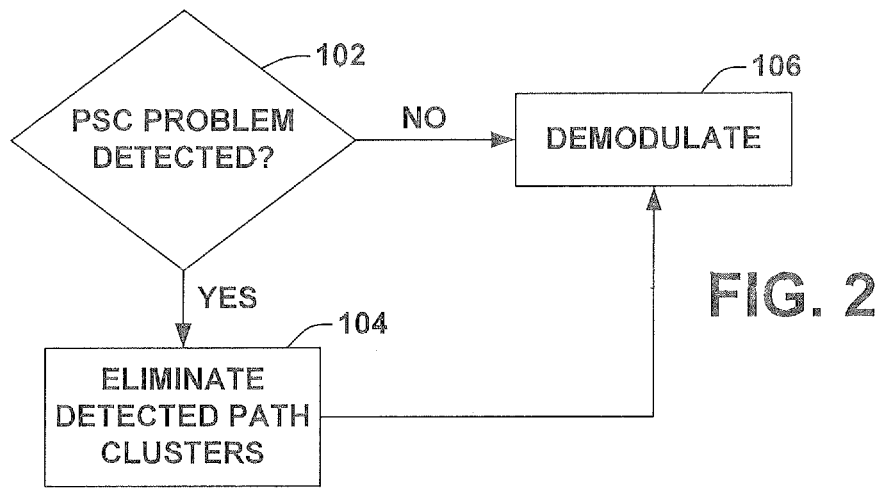
FIG. 2 is a flow chart diagram illustrating a method of detecting potential performance degradation caused by neighboring identical scrambling codes according to one embodiment of the invention.

According to one embodiment of the invention, in FIG. 2 a method 100 of detecting a potential performance degradation caused by neighboring identical scrambling codes is disclosed. While the exemplary method 100 is illustrated and described below as a series of acts or events, it will be appreciated that the present invention is not limited by the illustrated ordering of such acts or events. For example, some acts may occur in different order and/or concurrently with other acts or events apart from those illustrated and/or described herein, in accordance with the invention. In addition, not all illustrated steps may be required to implement a methodology in accordance with the present invention.

At a high level of abstraction, the method 100 of FIG. 2 comprises detecting an existence of identical scrambling codes in received signals at 102. If such a condition is detected (YES at 102), the method 100 then selectively eliminates one or more signals from consideration in the processing of the received signals at 104. The processing, such as a demodulation of a remaining signal or signals may then proceed at 106. Alternatively, if the existence of identical scrambling codes is not detected (NO at 102), then all the received signals are subsequently processed, for example, such signals are demodulated.

Figure 3:
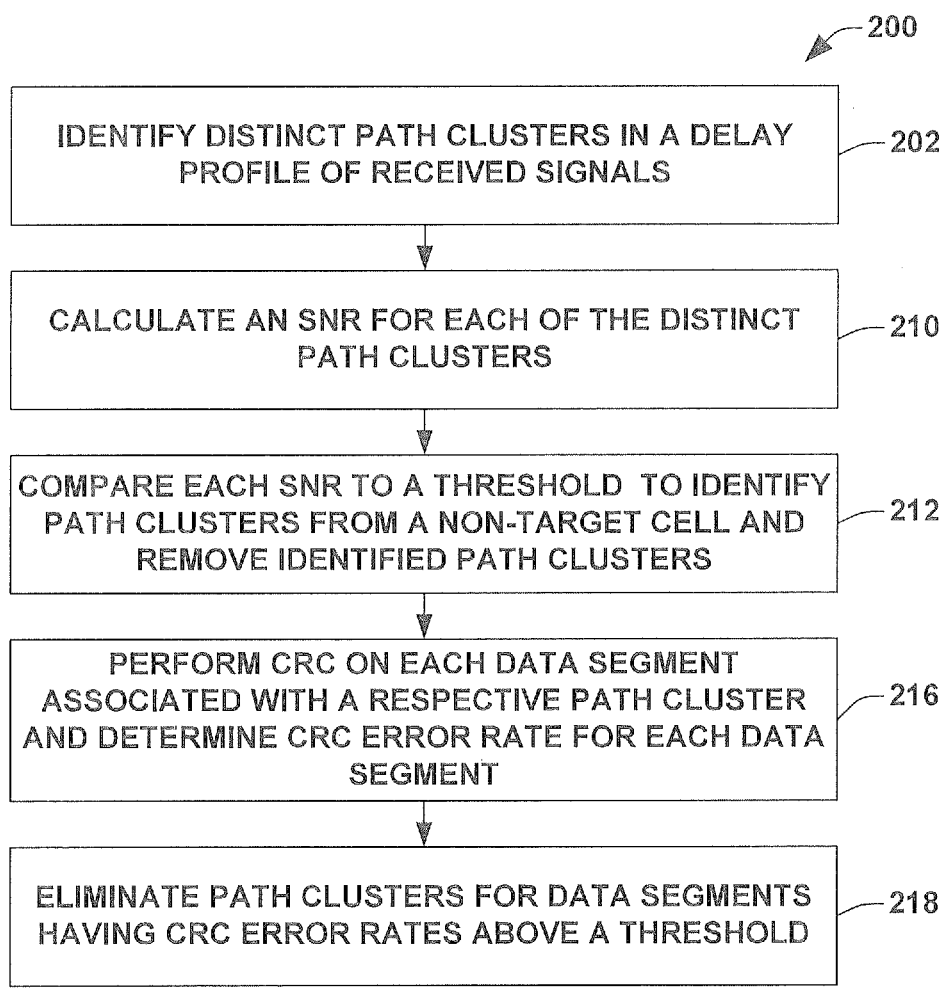
FIG. 3 is a flow chart diagram illustrating a method of detecting potential performance degradation caused by neighboring identical scrambling codes according to another embodiment of the invention.
Figure 4:
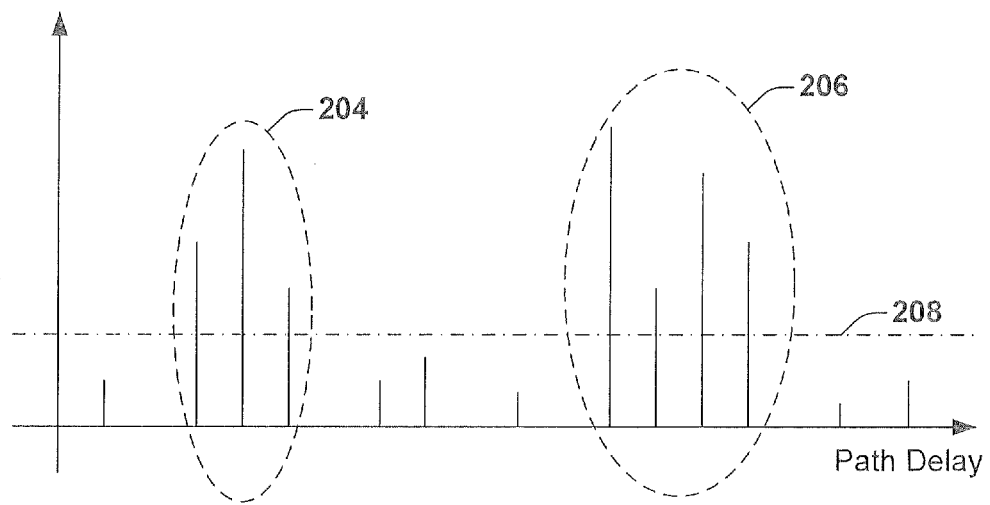
FIG. 4 is a graph that illustrates a plurality of path clusters representing detected paths with high peaks of energy within a predetermined range of timing delays.

According to another embodiment of the invention, a method 200 of detecting a potential performance degradation caused by neighboring identical scrambling codes comprises identifying distinct path clusters in a delay profile of received signals at 202, and is illustrated in FIG. 3. A receiver is configured to detect path clusters that are paths with high energy peaks within a certain range or window of timing delays. One example of identified path clusters is illustrated in FIG. 4 at reference numerals 204 and 206, respectively. As shown in FIG. 4, path clusters 204 and 206 may be identified as high peaks of signal energy within a certain range of timing delays (e.g., a window size of 240 half-chips). Peaks of energy within such a predefined delay range that exceed a predetermined energy threshold 208 (that can be adjusted as a configurable parameter) may then be identified as a distinct path cluster. Other manners of identifying path clusters may also be employed, and all such acts are contemplated as falling within the scope of the present invention. In addition, the present invention contemplates the case where a path cluster may comprise a single path. In such an instance, a computation (to be discussed infra) associated with each path may be performed. Therefore the term path cluster is intended to be interpreted broadly.

At this point in the method 200, it is not conclusive whether any of the identified path clusters is a "desired" cluster (i.e., one that will contribute in a positive fashion to the subsequent demodulation process and thus should be kept). An example of a contributing path cluster is the original signal itself and/or a signal coming from a repeater (i.e., from the same base station BTS with identical signal and data channels, where the original signal is simply amplified/repeated). An example of an undesired or interfering path cluster is a signal coming from a different base station. Such a signal either generates noise and thus impacts the signal-to-noise ratio (SNR), or carries data with different signaling and data information (e.g., data for another user), and thus would likely result in CRC errors.

According to one embodiment of the invention, determining whether an identified path cluster should be kept or discarded is based on a calculated SNR at 210 and 212 in the method 200 of FIG. 3. In one embodiment, an SNR computation is made for each distinct path cluster at 210, and the resultant SNRs are then compared to a predetermined threshold value at 212. In one embodiment the SNRs are calculated using each RAKE finger within a RAKE receiver, wherein several fingers may belong/contribute to one identified path cluster. In this context, a cluster SNR may be considered to be an average or a weighted average of selected finger SNRs associated with the respective cluster. At 212, any path cluster having an SNR that falls below the predetermined threshold is discarded as being associated with a non-target BTS. In one embodiment the predetermined SNR threshold value is fixed, however, in alternative embodiments the threshold value is a variable that may be modified as a function of general noise conditions or other system criteria.

The remaining path cluster or clusters (i.e., the ones having SNRs greater than the threshold and thus not discarded) comprise one or more distinct data segments, respectively. In accordance with one embodiment of the invention, detection of identical scrambling codes further comprises performing acyclic redundancy check (CRC) on each of the remaining data segments at 216. A CRC is sometimes referred to as a polynomial code checksum, and is a hash function designed to detect accidental changes to data. The CRC code is a short, fixed length binary sequence for each block of data and is sent with the data block itself. When the block is received the receiver repeats the calculation that generated the CRC code and if the new CRC does not match the one calculated earlier then a conclusion is made that the block of data contains a data error.

In some unique instances, the SNR of an undesired path cluster can still be relatively good, resulting in an SNR that may exceed the predetermined SNR threshold, and thus such path cluster is maintained. Since such a path cluster, has differing data content (since it is coming from an unwanted BTS and is intended for a different user), the different data content will likely be identified via a CRC, resulting in a CRC error rate that is substantially higher than would be otherwise expected.

In one embodiment, the path clusters associated with data segments having a CRC error rate that is greater than a predetermined CRC error threshold are also discarded at 218. In one embodiment, the predetermined CRC error threshold is a fixed value, however, in alternative embodiments the threshold may be a variable that varies as a function of one or more system or environment conditions. In another embodiment, the CRC error rates of multiple path clusters are compared to one another as opposed to compared to a threshold. If one CRC error rate exceeds another by more than a threshold amount or percentage, that path cluster is discarded.

The method 200 then proceeds to a demodulation of the path clusters that have not been discarded, for example, at 106 of FIG. 2.

Figure 5:
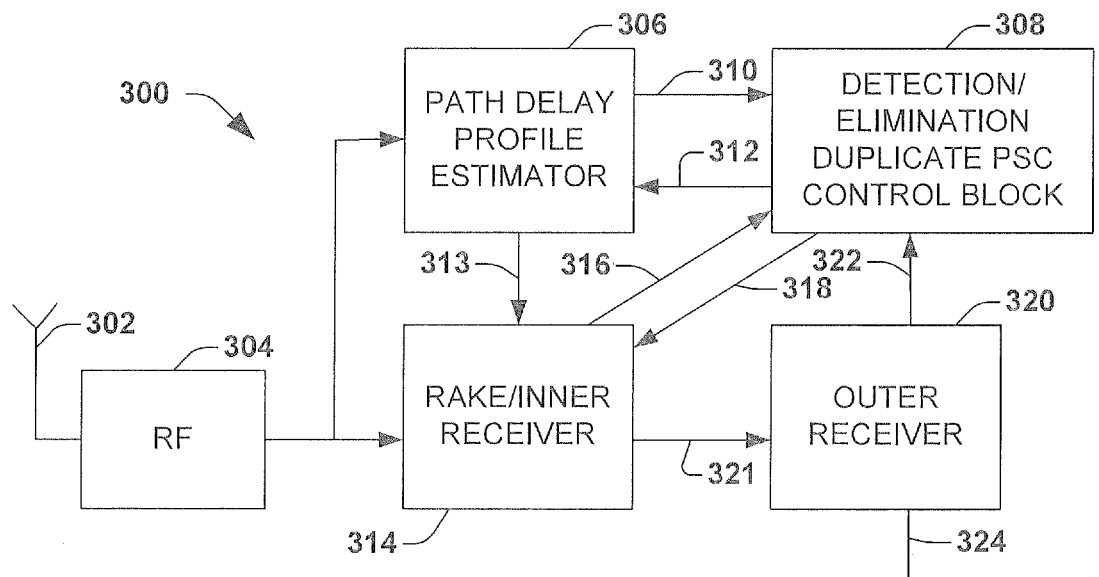
FIG. 5 is a block diagram illustrating a receiver structure configured to detect potential performance degradation caused by neighboring identical scrambling codes according to an embodiment of the invention.

Turning now to FIG. 5, a receiver 300 is disclosed that is configured to detect a potential performance degradation caused by neighboring identical scrambling codes. The receiver 300 includes an RF antenna 302 that is configured to receive RF signals, and an RF module 304 that is configured to down-convert the RF signals down to an intermediate frequency (IF) or a baseband frequency. Further portions of the receiver 300 include a path delay profile estimator block 306. In wireless communications, a transmit antenna is typically not narrowly focused spatially solely toward the intended receiver. Therefore in addition to a direct path, many other propagation paths exist between the transmitter and the receiver. These alternative propagation paths are often caused by reflections of the signal from surrounding objects. Typically in a RAKE receiver, each finger is assigned one of the multi-path components and is provided a reference copy of a spreading code that is uniquely delayed by a delay time associated with each of the multi-path components, respectively. The path delay profile estimator block 306 operates to identify the delay associated with each of the multi-path components.

In one embodiment the path delay profile estimator 306 operates as a peak detection oriented delay estimator that evaluates a channel impulse response over an entire range of possible delays (i.e., the delay spread), and then generates a power delay profile that is then subjected to peak detection. Since the path delay profile estimator 306 already generates a power delay profile, such power delay profile may be employed as shown in FIG. 4 to identify distinct path clusters. Thus in one embodiment the path delay profile estimator 306 provides the power delay profile at 300 to a detection/elimination block 308 that evaluates the power delay profile received at 310 to identify the one or more distinct path clusters.

The detection/elimination block 308 evaluates the power delay profile and looks for high energy peaks within a certain range of timing delays (e.g., a window of 240 half-chips) and if multiple peaks exist within such a range, a distinct path cluster is identified. Such path clusters exhibit energy that exceeds a predetermined threshold value, such as the threshold 208 in FIG. 4. The identified path clusters are then reported back to the path delay profile estimator 306 at line 312.

Based on the identified path clusters provided at 313, a RAKE receiver block 314 allocates the appropriate RAKE fingers associated with the delays of the identified path clusters, and calculates the SNR of the path clusters. The SNR calculation results are then reported by the RAKE receiver block 314 to the detection/elimination block 308 at 316. The detection block 308 then compares the SNRs of the distinct path clusters to a predetermined SNR threshold, and the clusters having an SNR below the threshold are identified as clusters to be discarded. Such clusters are discarded in one embodiment by the detection block 308 signaling to the RAKE receiver block 314 that certain RAKE fingers associated with multi-path components that correspond to the discarded path clusters can be turned off at 318.

The RAKE receiver block 314 then passes the accepted path clusters (i.e., the distinct data segments associated with the accepted path clusters) to the outer receiver block 320 via line 321. The outer receiver block 320 is configured to perform CRC calculations on distinct data segments associated with the respective path clusters. The resultant CRC error rate is then reported by the outer receiver block 320 to the detection/elimination block 308 at 322. The detection/elimination block 308 then compares the CRC error rates of the distinct segments to a CRC threshold or to one another to further determine whether additional path clusters are to be eliminated. If some of the CRC error rates exceed a predetermined threshold or exceed the error rate of other data segments by more than a predetermined amount, the detection/elimination block 308 sends further instructions to the RAKE receiver 314 via line 318 to deactivate the finger(s) associated with such path clusters/data segments. Going forward, the RAKE receiver block 314 and outer receiver block 320 then operate to demodulate the received signals of the desired BTS and provide such data at an output 324, and discard the signals of an unwanted BTS that happened to have an identical PSC.

Although the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A method of detecting potential performance degradation caused by neighboring identical scrambling codes, comprising:
   detecting an existence of identical scrambling codes in received signals from different base stations using a detection component at a user equipment; and
   selectively eliminating one or more signals from consideration in processing of received signals based upon the detection using an elimination component at the user equipment.

2. The method of claim 1, wherein detecting an existence of identical scrambling codes in received signals comprises:
   identifying distinct path clusters in a delay profile of the received signals;
   evaluating the identified distinct path clusters; and identifying one or more path clusters associated with one or more signals from a cell that is not a target cell based on the evaluation.

3. The method of claim 2, wherein evaluating the identified distinct path clusters comprises:
   calculating a signal-to-noise ratio for each of the distinct path clusters; and
   comparing the calculated signal-to-noise ratios to a predetermined signal-to-noise threshold value.

4. The method of claim 3, wherein identifying one or more path clusters associated with one or more signals from a base station that is not the target base station comprises identifying the one or more path clusters having a calculated signal-to-noise ratio that falls below the predetermined threshold value.

5. The method of claim 2, wherein evaluating the identified distinct path clusters comprises:
   associating the identified distinct path clusters with distinct data segments based on the received signals;
   performing a cyclic redundancy check on each of the distinct data segments; and
   determining a cyclic redundancy check error rate for each of the distinct data segments.

6. The method of claim 5, wherein identifying one or more path clusters associated with one or more signals from a base station that is not the target base station comprises identifying the one or more path clusters having a cyclic redundancy check error rate that exceeds a predetermined error rate threshold value.

7. The method of claim 2, wherein eliminating one or more signals from consideration comprises eliminating one or more signals associated with the one or more identified path clusters.

8. The method of claim 2, wherein evaluating the identified path clusters comprises:
   calculating a signal-to-noise ratio for all the identified path clusters;
   separating the identified path clusters into a first group having signal-to-noise ratios above a predetermined signal-to-noise ratio threshold, and a second group having signal-to-noise ratios below the predetermined signal-to-noise ratio threshold;
   associating the first group of identified path clusters with distinct data segments based on the received signals;
   performing a cyclic redundancy check on each of the distinct data segments; and
   determining a cyclic redundancy check error rate for each of the distinct data segments.

9. A receiver configured to detect potential performance degradation caused by neighboring identical scrambling codes, comprising:
   a detection component configured to detect an existence of identical scrambling codes in received signals from different base stations at the receiver within a user equipment; and
   an elimination component configured to selectively eliminate one or more signals from consideration in processing of received signals based upon the detection by the detection component.

10. The receiver of claim 9, wherein the detection component comprises a path cluster detector configured to detect one or more distinct path clusters in a delay profile of received signals.

11. The receiver of claim 10, wherein the path cluster detector is configured to identify energy peaks of the received signals in a timing window, compare the energy peaks to a predetermined energy threshold, and identify peaks as a distinct path cluster if the energy peaks, or a portion thereof, exhibit a power level greater than the predetermined energy level.

12. The receiver of claim 10, wherein the detection component further comprises a signal-to-noise ratio (SNR) detector configured to measure the SNR of each of the one or more detected distinct path clusters.

13. The receiver of claim 12, wherein the elimination component is configured to compare the SNRs of each of the one or more detected distinct path clusters to a predetermined SNR threshold value, and discard the distinct path clusters if they have an SNR that falls below the predetermined SNR threshold value.

14. The receiver of claim 13, wherein the detection component is further configured to associate detected distinct path clusters having an SNR greater than the predetermined SNR threshold value with distinct data segments based on the received signals.

15. The receiver of claim 14, wherein the detection component is further configured to perform a cyclic redundancy check (CRC) on each distinct data segment to generate a CRC error rate for each data segment.

16. The receiver of claim 15, wherein the elimination component is further configured to compare the CRC error rates of each data segment to a CRC error rate threshold, and discard path clusters associated with data segments having a CRC error rate that exceeds the CRC error rate threshold.

17. The receiver of claim 15, wherein the elimination component is further configured to compare the CRC error rates of each data segment to one another, and discard path clusters associated with data segments having a CRC error rate that exceeds the CRC error rate of another data segment by a predetermined amount or by a predetermined percentage.

18. A receiver configured to detect potential performance degradation caused by neighboring identical scrambling codes, comprising:
   a path delay profile estimator configured to receive signals and generate a power profile illustrating energy peaks of the received signals over a path delay range;
   a detection component configured to identify one or more path clusters in the power profile;
   a RAKE receiver component configured to receive the signals as individual multi-path components for respective fingers of the RAKE receiver component and calculate signal-to-noise ratios (SNRs) for each identified path cluster; and
   an elimination component configured to evaluate the SNRs of each identified path cluster and discard an identified one or more path clusters if the SNR thereof is less than a predetermined SNR threshold value.

19. The receiver of claim 18, wherein the elimination component is configured to discard the identified one or more path clusters by deactivating a corresponding finger of the RAKE receiver component.

20. The receiver of claim 18, further comprising an outer receiver component configured to perform a cyclic redundancy check (CRC) on one or more data segments that are associated with remaining, non-discarded path clusters, respectively, and selectively remove data segments based on a resultant CRC error rate of each data segment.

* * * * *